US008928283B2

(12) United States Patent
Nakao

(10) Patent No.: US 8,928,283 B2
(45) Date of Patent: Jan. 6, 2015

(54) ELECTRICITY STORAGE SYSTEM HAVING A PLURALITY OF SERIES-CONNECTED STORAGE CELLS

(75) Inventor: Fumiaki Nakao, Shizuoka (JP)

(73) Assignee: FDK Corporation, Tokyo (JP)

( * ) Notice: Subject to any disclaimer, the term of this patent is extended or adjusted under 35 U.S.C. 154(b) by 362 days.

(21) Appl. No.: 12/903,699

(22) Filed: Oct. 13, 2010

(65) Prior Publication Data
US 2011/0084668 A1    Apr. 14, 2011

(30) Foreign Application Priority Data

Oct. 14, 2009 (JP) ................. 2009-237282
Oct. 20, 2009 (JP) ................. 2009-241510

(51) Int. Cl.
*H02J 7/00* (2006.01)
*H01M 10/44* (2006.01)
*H01M 10/48* (2006.01)

(52) U.S. Cl.
CPC ........... *H02J 7/0019* (2013.01); *H01M 10/441* (2013.01); *H01M 10/482* (2013.01); *H02J 7/0065* (2013.01); *Y02T 10/7055* (2013.01)
USPC .......................................... 320/119; 320/149

(58) Field of Classification Search
USPC .................................................. 320/118, 119
See application file for complete search history.

(56) References Cited

U.S. PATENT DOCUMENTS

| | | | |
|---|---|---|---|
| 5,412,305 A * | 5/1995 | Jeanneret | 320/119 |
| 5,666,041 A | 9/1997 | Stuart et al. | |
| 6,297,616 B1 * | 10/2001 | Kubo et al. | 320/116 |
| 6,806,685 B2 * | 10/2004 | Suzuki et al. | 320/116 |
| 7,049,791 B2 * | 5/2006 | Lin et al. | 320/121 |
| 2010/0253286 A1 * | 10/2010 | Sutardja | 320/118 |

FOREIGN PATENT DOCUMENTS

| | | |
|---|---|---|
| JP | 11-262188 A | 9/1999 |
| JP | 3267221 B2 | 3/2002 |
| JP | 3630303 B2 | 3/2005 |
| JP | 2006-254535 A | 9/2006 |
| JP | 2008-504797 A | 2/2008 |
| JP | 2009-183025 A | 8/2009 |
| WO | 2007145459 A1 | 12/2007 |
| WO | 2007145463 A1 | 12/2007 |
| WO | 2008097033 A1 | 8/2008 |

* cited by examiner

*Primary Examiner* — Edward Tso
*Assistant Examiner* — Robert Grant
(74) *Attorney, Agent, or Firm* — McDermott Will & Emery LLP

(57) ABSTRACT

An electricity storage system includes a plurality of storage modules connected in series, each storage module including a single storage cell or a plurality of storage cells connected in series, an isolation transformer and a rectifying circuit that are associated with each of the storage modules, the isolation transformer having a primary winding and a secondary winding, and a voltage balancing circuit that generates an alternating current by switching a direct-current power source, the primary windings of the isolation transformers being all connected in parallel and connected to an output end of the voltage balancing circuit by a common wiring, the secondary windings of the isolation transformers being connected to the corresponding storage modules via the respective rectifying circuits, the alternating current being supplied to the primary winding of each of the isolation transformers.

11 Claims, 3 Drawing Sheets

ELECTRICITY STORAGE SYSTEM HAVING A PLURALITY OF SERIES-CONNECTED STORAGE CELLS

CROSS-REFERENCE TO RELATED APPLICATIONS

The present application claims priority upon Japanese Patent Application Nos. 2009-237282 and 2009-241510 filed on Oct. 14, 2009 and Oct. 20, 2009, respectively, which are herein incorporated by reference.

BACKGROUND

1. Technical Field

The present invention relates to an electricity storage system having a plurality of series-connected storage cells.

2. Related Art

Electric vehicles, plug-in hybrid vehicles and electricity storage systems for interconnection are some of the examples that utilize series-connected multiple storage cells in which a plurality of storage cells are connected in series. In charging and discharging such series-connected multiple storage cells, it is necessary to equalize voltages of the cells. Accordingly, the series-connected multiple cells are used with a voltage balancing circuit such as those disclosed in Japanese Patent Nos. 3267221 and 3630303.

The voltage balancing circuits disclosed in Japanese Patent Nos. 3267221 and 3630303 utilize a flyback-type multi-winding transformer having a plurality of secondary windings magnetically coupled to a single primary winding in a mutually isolated manner, and equalize voltages on the cells by supplying the primary winding with a pulsed current from a balancing power source via a switching element and individually supplying each of the cells with a secondary current induced in each secondary winding by the pulsed current.

It is preferable that such balancing is performed only when necessary and stopped while the voltages on the cells are in a balanced state. Therefore, according to Japanese Patent Nos. 3267221 and 3630303, current detecting means are provided at respective connections between cells and controlling is performed in such a manner that, in a case where all the detection values from respective current detecting means are approximately zero (+/−0 A), the cell voltages are determined to be in a balanced state and supplying of a pulsed current to the primary winding is started or stopped.

Further, JP-A-2009-183025 discloses that, in order to monitor for a balanced state of cell voltages in series-connected multiple cells, terminal voltages of the cells are individually measured, measurement results are selected at a selecting circuit and AD converted, and an AD-converted result is transmitted to an integrated circuit (micro-computer) via a signal transmission path for a diagnosis of an unusual condition.

FIG. 3 illustrates a voltage balancing circuit that was studied by the inventor before the present invention. The voltage balancing circuit illustrated in FIG. 3 is referred to as a flyback type and, in order to equalize voltages of cell modules M1-Mn each including a series-connected multiple storage cells 11, each cell module M1-Mn is independently charged by utilizing a flyback-type multi-winding transformer (flyback transformer) Tx.

The multi-winding flyback transformer Tx has a plurality of secondary windings L21-L2$n$ with respect to a single primary winding L11. The plurality of secondary windings L21-L2$n$ is mutually isolated and each of the secondary windings L21-L2$n$ is magnetically coupled to the primary winding L11.

A pulsed current is applied to the primary winding L11 from a balancing power supply E1 via a switching element S1. As a result, secondary currents are induced in the secondary windings L21-L2$n$, respectively. The secondary windings L21-L2$n$ are individually connected to the cell modules M1-Mn in a one-to-one correspondence via individual wirings 31.

The secondary currents induced in the secondary windings L21-L2$n$ are individually supplied to the cell modules M1-Mn via the individual wirings 31. For each module M1-Mn, the secondary current is rectified by a rectifying circuit D1 and is supplied as a charging current to the cell module M1-Mn. Thus, the voltage of the series of storage cells 10 can be equalized on a module-to-module basis between the modules M1-Mn.

The background technologies described above have disadvantages described below.

The flyback-type multi-winding transformer utilizes a magnetic core having a magnetic gap to obtain a required inductance with a predetermined winding, but since a leakage flux from the magnetic gap is large, this leakage flux tends to be a cause for noise generation.

The wirings 31 between the secondary windings L21-L2$n$ and the cell modules M1-Mn are a large number of individual wirings and, in addition, a wire diameter must be made large because of a relatively large secondary current flowing in each of the wirings. Therefore, there are disadvantages that the wirings become congested and that the cost becomes increased.

In order to meet an arrangement of the modules M1-Mn, the individual wirings 30 between the transformer Tx and respective cell modules M1-Mn need to be elongated to some extent. However, harmonic noise is radiated from the elongated wirings 30.

In the exemplary circuit illustrated in the drawings, although only three secondary windings L21-L2$n$ are shown for the sake of simplicity of explanation, a series-connected multiple cells used in, for example, electric vehicles, plug-in hybrid vehicles and electricity storage system for interconnection may include several to several hundreds of cell modules. In such a case, since a number of secondary windings of the multi-winding transformer will also increase, the above-mentioned disadvantages will become more significant.

The voltage balancing circuits disclosed in Japanese Patent Nos. 3267221 and 3630303 make a determination of whether or not in a balanced condition based on an electric current flowing through a connection between cells. This determination can be effectively carried out while a cell balancing circuit is in operation and equalization of cell voltages cannot be performed in a stopped state (or in a state of being kept in a storage) in which equalization control is not operating.

The technology disclosed in JP-A-2009-183025 has a disadvantage of an increased cost because it uses an AD converter, a micro-computer, a signal transmission path, etc.

The present invention have been made in consideration of the disadvantages described above, and it is an object of the invention to provide an electricity storage system having a voltage balancing circuit for series-connected multiple storage cells that has a reduced number of wirings between the transformer and the cell modules and has a reduced wire diameter, that can thereby avoid congestion of the wirings and reduce the cost, as well as, reduce the noise generated from the transformer and the wirings.

It is also an object to provide a voltage balancing circuit having a voltage balancing circuit for series-connected multiple storage cells that can perform voltage balancing of a plurality of storage cells or cell modules that are connected in series as needed in any of the cases during charging, during discharging or while being kept in a storage.

SUMMARY

According to an aspect of the invention, an electricity storage system includes:

a plurality of storage modules connected in series, each storage module including a single storage cell or a plurality of storage cells connected in series;

an isolation transformer and a rectifying circuit that are associated with each of the storage modules, the isolation transformer having a primary winding and a secondary winding; and a voltage balancing circuit that generates an alternating current by switching a direct-current power source, the primary windings of the isolation transformers being all connected in parallel and connected to an output end of the voltage balancing circuit by a common wiring, the secondary windings of the isolation transformers being connected to the corresponding storage modules via the respective rectifying circuits, the alternating current being supplied to the primary winding of each of the isolation transformers.

DESCRIPTION OF EXEMPLARY EMBODIMENTS

Figure 1:
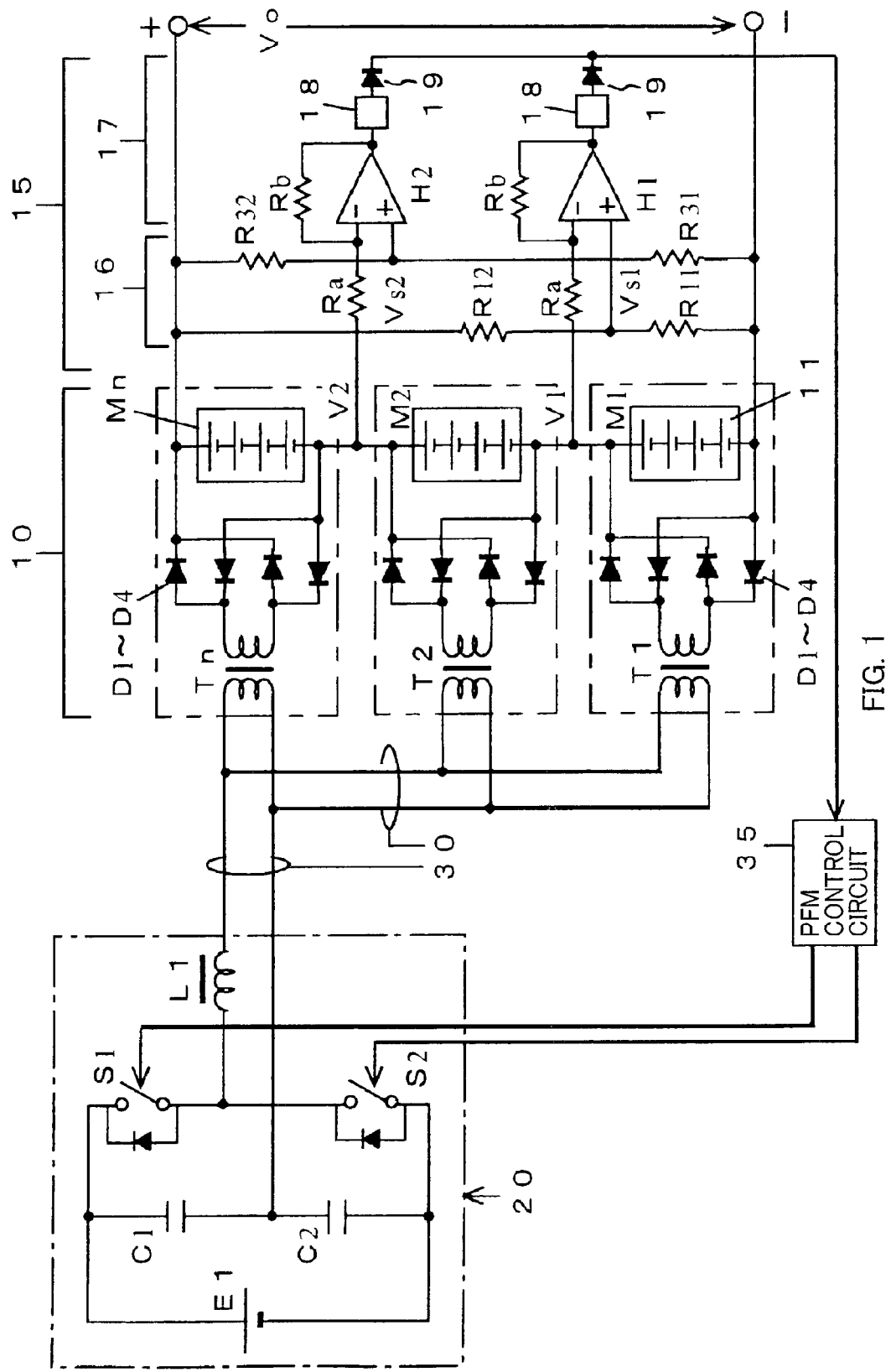
FIG. 1 is a circuit diagram illustrating an electricity storage system having a voltage balancing circuit for a plurality of series-connected storage cells according to an embodiment of the present invention.

At least the following details will become apparent from descriptions in this specification and of the accompanying drawings.

According to a first aspect of the invention, an electricity storage system includes:

a plurality of storage modules connected in series, each storage module including a single storage cell or a plurality of storage cells connected in series;

an isolation transformer and a rectifying circuit that are associated with each of the storage modules, the isolation transformer having a primary winding and a secondary winding; and a voltage balancing circuit that generates an alternating current by switching a direct-current power source, the primary windings of the isolation transformers being all connected in parallel and connected to an output end of the voltage balancing circuit by a common wiring, the secondary windings of the isolation transformers being connected to the corresponding storage modules via the respective rectifying circuits, the alternating current being supplied to the primary winding of each of the isolation transformers.

With the electricity storage system described above, in a voltage balancing circuit of the series-connected multiple cells of a transformer type, the number of wirings between the transformer and the cell modules can be reduced and the wire diameter can be reduced. Therefore, congestion of the wirings can be avoided and the cost can be reduced, while reducing the noise generated from the transformer and the wirings.

Further, with the electricity storage system described above, in a voltage balancing circuit of the series-connected multiple cells of a transformer type, voltage balancing of storage cells or cell modules can be performed at a low cost and in a stable manner as needed in any of the cases during charging, during discharging or while being kept in a storage.

With the electricity storage system described above, it is preferable that the voltage balancing circuit includes a switch that switches the direct-current power source, a switching control circuit that turns ON/OFF the switch, and an inductor that is provided on an alternating current path.

With the electricity storage system described above, it is preferable that the voltage balancing circuit includes a capacitor on the alternating current path in addition to the inductor.

It is preferable that the electricity storage system further includes a balance detection circuit that detects a difference between voltages on the storage modules.

With the electricity storage system described above, it is preferable that, in accordance with an output of the balance detection circuit, the switching control circuit increases a frequency of the switching as the difference between the voltages on the storage modules becomes greater.

With the electricity storage system described above, it is preferable that, in accordance with an output of the balance detection circuit, the switching control circuit stops a switching operation in a case where the difference between the voltages on the storage modules is less than or equal to a reference.

With the electricity storage system described above, it is preferable that, the voltage balancing circuit includes a first capacitor and a second capacitor that are connected in series to both ends of the direct-current power source, a first switch and a second switch that are connected in series to the both ends of the direct-current power source, an inductor connected on a common wiring that links a connection point between the first and second capacitors and a connection point between the first and second switches to the primary windings of the respective isolation transformers, and a switching control circuit that turns ON the first and second switches in an alternating manner.

It is preferable that the electricity storage system further comprises a balance detection circuit that detects a difference between voltages on the storage modules.

With the electricity storage system described above, it is preferable that, in accordance with an output of the balance detection circuit, the switching control circuit decreases a time interval during which the first and second switches are turned ON as the difference between the voltages of the storage modules becomes greater.

With the electricity storage system described above, it is preferable that, in accordance with an output of the balance detection circuit, the switching control circuit keeps the first and switches in an OFF state in a case where the difference between the storage modules is less than or equal to a reference.

With the electricity storage system described above, it is preferable that, a reference voltage is a voltage that appears at a connecting point between the storage modules in a case where voltages of the storage modules are equal, and the balance detecting circuit detects the difference between a voltage at the connecting point between the storage modules and the reference voltage.

It is preferable that the direct-current power source of the voltage balancing circuit is the storage modules connected in series.

It is preferable that the direct-current power source of the voltage balancing circuit is an external power source that is different from the storage modules and the storage modules are charged by the external power source via the voltage balancing circuit.

According to a second aspect of the invention, a charge balance correcting circuit of a multiple series storage cell is provided that equalizes voltages of a plurality of storage cells connected in series on a cell module-to-cell module basis, each cell module including a single storage cell or a plurality of storage cells connected in series, wherein each cell module includes individually provided transformers and rectifying circuits, each isolation transformer having a primary winding and a secondary winding that are magnetically coupled to each other, a secondary electric current induced in the secondary winding of the transformer being rectified by each rectifying circuit and supplied to charge the cell module, wherein the primary winding of each transformer is connected to a resonant current-generating circuit, and wherein the resonant current-generating circuit includes a resonance circuit that has an inductor and a capacitor and a switching element that drives the resonant circuit in a resonating manner by a pulsed energization of a balance correction power source, a resonant current generated by each pulsed energization being distributed to the primary winding of each transformer.

With the charge balance correcting circuit described above, it is preferable that the resonant current generated in the resonant current generating circuit is distributed to the primary winding of each transformer via a common wiring.

With the charge balance correcting circuit described above, it is preferable that the resonant current generating circuit includes a series resonant circuit having an inductor and a capacitor.

It is preferable that the charge balance correcting circuit of a multiple series storage cell further includes:

a voltage dividing circuit that divides an output voltage of the multiple series storage cell using resistances to obtain a reference voltage that is the same as an intermediate voltage expected to appear at a connection point between the cell modules in a case where voltages of the cell modules are equal to each other; and a difference detecting circuit that detects an absolute value of a difference between a divided voltage of the voltage dividing circuit and an intermediate voltage corresponding to the divided voltage, a detection output of the difference detecting circuit being fed back to a pulse control circuit.

With the charge balance correcting circuit described above, it is preferable that the difference detecting circuit detects an absolute value of a difference between the divided voltage of the voltage dividing circuit and the intermediate voltage corresponding to the divided voltage in a proportion of a predetermined amplification gain.

With the charge balance correcting circuit described above, it is preferable that an output of the multiple series storage cell is used as a power source for balance correction of the multi-series storage cell.

According to a third aspect of the invention, a charge balance correcting circuit of a multiple series storage cell is provided that equalizes module voltages of the multiple series storage cell in which a plurality of cell modules are connected in series, each cell module including a single storage cell or a plurality of storage cells connected in series, wherein each cell module is individually supplied with balance correction charging electric current by being connected to a secondary winding of a transformer that is magnetically coupled to a primary winding via a rectifying circuit, wherein the primary winding is connected to a balance correction power supply via a switching element that applies electric current pulses, wherein the charge balance correcting circuit has a voltage dividing circuit that resistance voltage divides an output voltage of the multiple series storage cell and generates a standard voltage that is equal to an intermediate voltage that is expected to appear at a connecting point between the modules in a case where a voltage of each module is equivalent with each other, wherein the charge balance correcting circuit has a difference detecting circuit that detects an absolute value of a difference between the intermediate voltage and the standard voltage, and wherein the charge balance correcting circuit is provided with a control circuit that feedback controls an electric current pulse applying operation of the switching element in such a manner that the absolute value of the difference becomes minimum.

With the charge balance correcting circuit described above, it is preferable that the difference detection circuit proportionally detects the difference between the intermediate voltage and the reference voltage with a predetermined amplification gain.

It is preferable that the multiple series storage cell includes three or more cell modules connected in series and the voltage dividing circuit includes resistance elements of a same number as the cell modules, the resistance elements being connected in series between output ends of the multiple series storage cell, the charge balance correcting circuit is provided with a plurality of difference detection circuits that compare a plurality of intermediate voltages appearing at every connection point between the cell modules and a plurality of reference voltages obtained at every connection point between the resistance elements that are the same in a case where the voltages of the modules are equivalent to each other, respectively, and output absolute values of the differences, and the charge balance correcting circuit is provided with a logic adding circuit that feeds back a maximum output value among outputs of the difference detection circuit to a control circuit.

It is preferable that each cell module includes individually provided transformers and rectifying circuits, each isolation transformer having a primary winding and a secondary winding that are magnetically coupled to each other, a secondary electric current induced in the secondary winding of the transformer being rectified by each rectifying circuit and supplied to charge the cell module, the primary winding of each transformer is commonly connected to a resonant current-generating circuit, the resonant current-generating circuit includes a resonance circuit that has an inductor and a capacitor and a switching element that drives the resonant circuit in a resonating manner by a pulsed energization of a balance correction power source, a resonant current generated by each pulsed energization being distributed to the primary winding of each transformer, a control circuit variably controls intervals and/or pulse widths of a pulsed energization by the switching elements, and a feedback control loop is formed that controls a resonant current distributed among primary windings of the transformers via the pulse control circuit.

With the charge balance correcting circuit described above, it is preferable that the resonant current generating circuit includes a series resonant circuit having an inductor and a capacitor.

FIG. 1 illustrates an electricity storage system including a voltage balancing circuit for a plurality of series-connected storage cells according to an embodiment of the present invention.

Using transformers T1, T2, Tn, the voltage balancing circuit illustrated in FIG. 1 equalizes voltages (module voltages) of cell modules M1, M2, Mn constituting a series of storage cells 10.

In this embodiment, the cell module M1, M2, Mn includes a plurality of storage cells 11 connected in series. A series of storage cells 10 having a predetermined terminal voltage is constituted by connecting an arbitrary number of cell modules M1, M2, Mn in series.

The balance correcting circuit of the embodiment is one of transformer-type balance correcting circuits which is different from a flyback-type balance correcting circuit of a related art in that it does not use a multi-winding flyback transformer. Instead, isolation transformers T1, T2, Tn each having a primary winding and a secondary winding are provided with respect to the cell modules M1, M2, Mn, respectively. Voltage equalization is performed between the cell modules M1, M2, Mn.

Each of the cell modules M1, M2, Mn is provided with the isolation transformer T1, T2, Tn having the first winding and the second winding that are magnetically coupled with each other in an isolated manner, as well as, rectifying circuits D1-D4 that rectify a secondary current induced in the secondary winding of the transformer T1, T2, Tn and supply and charge the storage cells 11 in the cell module M1, M2, Mn.

The primary windings of the respective transformers T1, T2, Tn are commonly connected to a resonant current generating circuit 20 via a common wiring 30. The resonant current generating circuit 20 includes a resonant circuit that has an inductor L1 and capacitors C1, C2 and switching elements S1, S2 that drives the resonant circuit in a resonating manner by supplying a pulsed current from a balancing power supply E1. The resonant current generated by each pulsed current is distributed between the primary windings of the transformers T1, T2, Tn, respectively, via the common wiring 30.

Here, the transformers T1, T2, Tn have the same turns ratio and primary voltages of the transformers T1, T2, Tn are restricted by voltages of modules M1, M2, Mn, respectively, that are connected on a secondary side. Therefore, in a case there is a voltage difference between the modules M1, M2, Mn, the resonant current distributed as a primary current among the transformers T1, T2, Tn will concentrate on a transformer connected to a module having a lowest voltage.

The resonant circuit is a series resonant circuit (series resonant-type current resonant circuit) that includes the switching elements S1, S2, the capacitors C1, C2, the inductor L1 and the transformers T1, T2, Tn. The resonant circuit is driven in a resonating manner by conduction of the switching elements (a pulsed current applying operation in an alternating manner) and causes a resonant current to flow. This resonant current is distributed as a primary current among the transformers T1, T2, Tn via the common wiring 30.

For example, MOS FETs whereto back diodes are equivalently connected are used as the switching elements S1, S2, and their switching operations are controlled by a PFM (pulse frequency modulation) control circuit 35. The PFM control circuit (pulse control circuit) 35 variably controls an interval (also a pulse width) between pulsed currents by the switching elements S1, S2 based on detection results from a balance detecting circuit 15 that detects a voltage difference between cell modules M1, M2, Mn.

That is to say, the PFM control circuit 35 forms a negative feedback control loop with which a feedback control is performed in such a manner that a voltage difference between the cell modules M1, M2, Mn detected by the balance detecting circuit 15 becomes minimum.

The balance detecting circuit 15 has a voltage dividing circuit 16 that generates reference voltages Vs1, Vs2 by resistance dividing an output voltage (terminal voltage) of the series of storage cells 10, and also has a difference detecting circuit 17.

The voltage dividing circuit 16 performs voltage division and generates the reference voltages Vs1, Vs2 that are the same as intermediate voltages V1, V2 expected to appear at connection points between the modules M1, M2, Mn in a case where respective voltages of the modules M1, M2, Mn are equal to each other. That is to say, a comparison is made between those that become the same in a case where the respective voltages of the modules M1, M2, Mn are equal to each other and an absolute value of the difference is outputted. The difference detecting circuit 17 detects the absolute value of the difference between the reference voltages (divided voltages) Vs1, Vs2 and the intermediate voltages V1, V2 that correspond to the reference voltages Vs1, Vs2, respectively.

The detection outputs of the difference detecting circuit 17 are inputted as a feedback to the PFM control circuit 35 via logic adding circuits 19, respectively. The logic adding circuit 19 is a logic adding circuit of an analog value and a maximum output value among the outputs of the difference detecting circuits 17 is fed back as a control signal to the PFM control circuit 35.

The voltage dividing circuit 16 includes resistive elements R11, R12, R31, R32 and has a number of divided voltage outputs corresponding to a number of connection points between the modules M1, M2, Mn. In the example shown in the drawings, since the number of connection points between modules M1, M2, Mn is two, the voltage dividing circuit 16 is configured to obtain two divided voltages corresponding to respective intermediate voltages appearing at each of the points.

The difference detecting circuit 17 includes operational amplifiers H1, H2. In the example shown in the drawings, since there are two sets of intermediate voltages and divided voltages to be compared, there are also two sets of operational amplifiers H1, H2. Respective differential amplifying outputs of the operational amplifiers H1, H2 are converted into absolute values at an absolute value detecting circuit 18 and outputted. The outputs of the absolute value detecting circuits 18 are logically added and inputted as a control signal to the PFM control circuit 35. The PFM control circuit 35 performs a feedback control of current conducting interval (frequency) of the switching elements S1, S2 in such a manner that both of the output values of the absolute value detecting circuit 18 becomes minimum.

The voltage balancing circuit of the above-mentioned embodiment does not use a multi-winding flyback transformer with a large leakage flux but utilizes the isolation transformers T1, T2, Tn each having a single primary winding and a single secondary winding. Since these transformers T1, T2, Tn do not require a magnetic gap for adjusting a winding inductance, noise irradiation by the leakage flux can be reduced.

An electric current for balance correction is distributed among the transformers T1, T2, Tn and such distribution of electric current can be carried out with a reduced number of wirings by using the common wiring 30. Moreover, since the electric current that is distributed by the common wiring 30 is a primary winding electric current that has a relatively small current value, a wire diameter of the wiring 30 can be reduced. Accordingly, congestion of wirings can be avoided and the cost can be reduced.

The electric current for balance correction that is distributed by the common wiring 30 is a resonant electric current and this resonant electric current has reduced harmonic components. Therefore, even if the common wiring 30 is elongated to comply with an arrangement of the modules M1, M2, Mn, radiation of a harmonic noise from the elongated wiring 30 can be reduced.

Accordingly, with the above-mentioned electricity storage system, the number of wirings between the transformers T1, T2, Tn and the cell modules M1, M2, Mn can be reduced and the diameter of the wiring can be made smaller. Thus, congestion of the wirings can be avoided and the cost can be reduced, and also, noise generated from the transformers T1, T2, Tn or the wiring 30 can be reduced.

Further, according to the present invention, a balanced condition of cell voltages is determined based on absolute value comparison between intermediate voltages V1, V2 appearing at the connection points between the cells and reference voltages Vs1, Vs2 generated by resistance dividing the output voltage (terminal voltage) of the series of storage cells 10, rather than based on an electric current flowing through a connection between the cells. Determination based on voltages can also be carried out accurately in a no-loaded state in which charging and discharging electric currents are not flowing.

Thus, voltage balancing of a multiplicity of cell modules M1, M2, Mn connected in series can be performed at a low cost in a stable manner in any of charging, discharging and storing when necessary.

The above-mentioned effect is particularly effective for series-connected storage cells such as those used in, for example, electric vehicles, plug-in hybrid vehicles and electricity storage system for interconnection, having a number of cell modules in an order of several tens to several hundreds.

In the embodiment described herein, although each of the cell modules M1, M2, Mn includes a plurality of storage cells 11 connected in series, a cell module may include a single storage cell. In such a case, since an electromotive force (charging and discharging voltage) of the cell module becomes low, it is preferable that the rectifying circuits D1 to D4 are constituted by switching diodes of MOS FET having a small ON resistance, rather than diodes having forward voltages.

In addition to the above-mentioned structure, according to the circuit of the embodiment illustrated in FIG. 1, the negative feedback resistance elements Ra, Rb for gain adjustment (gain suppression) are connected to the operational amplifiers H1, H2, respectively, that are included in the above-mentioned difference detecting circuit 17. Thus, the difference detecting circuit 17 performs a proportional operation and proportionally detects an absolute difference to an intermediate voltage corresponding to a dividing voltage in accordance with a predetermined amplification gain.

Due to a proportional operation (a linear operation) of the difference detecting circuit 17, for example in a case where a voltage balance condition becomes greatly deviated, a correction operation is performed with a corresponding control amount, whereas, in a balanced condition in which the voltages are substantially balanced, a correction operation is performed with a reduced control amount or a correction operation is stopped. As a result, since an operation of charging balance correction can be performed in just proportion with a control amount corresponding to the voltage balance condition of the modules M1, M2, Mn, an excessive correction operation can be suppressed and the equalization operation can be stabilized.

The balancing power supply E1 may be a separately prepared power source solely for balancing, and, in the present invention, it can be an output of the series of storage cells 10. By using the output of the series of storage cells 10 as the balancing power source E1 of the series of storage cells 10, equalization of voltages can be performed not only during charging but also during discharging or while being kept in a storage.

Figure 2:
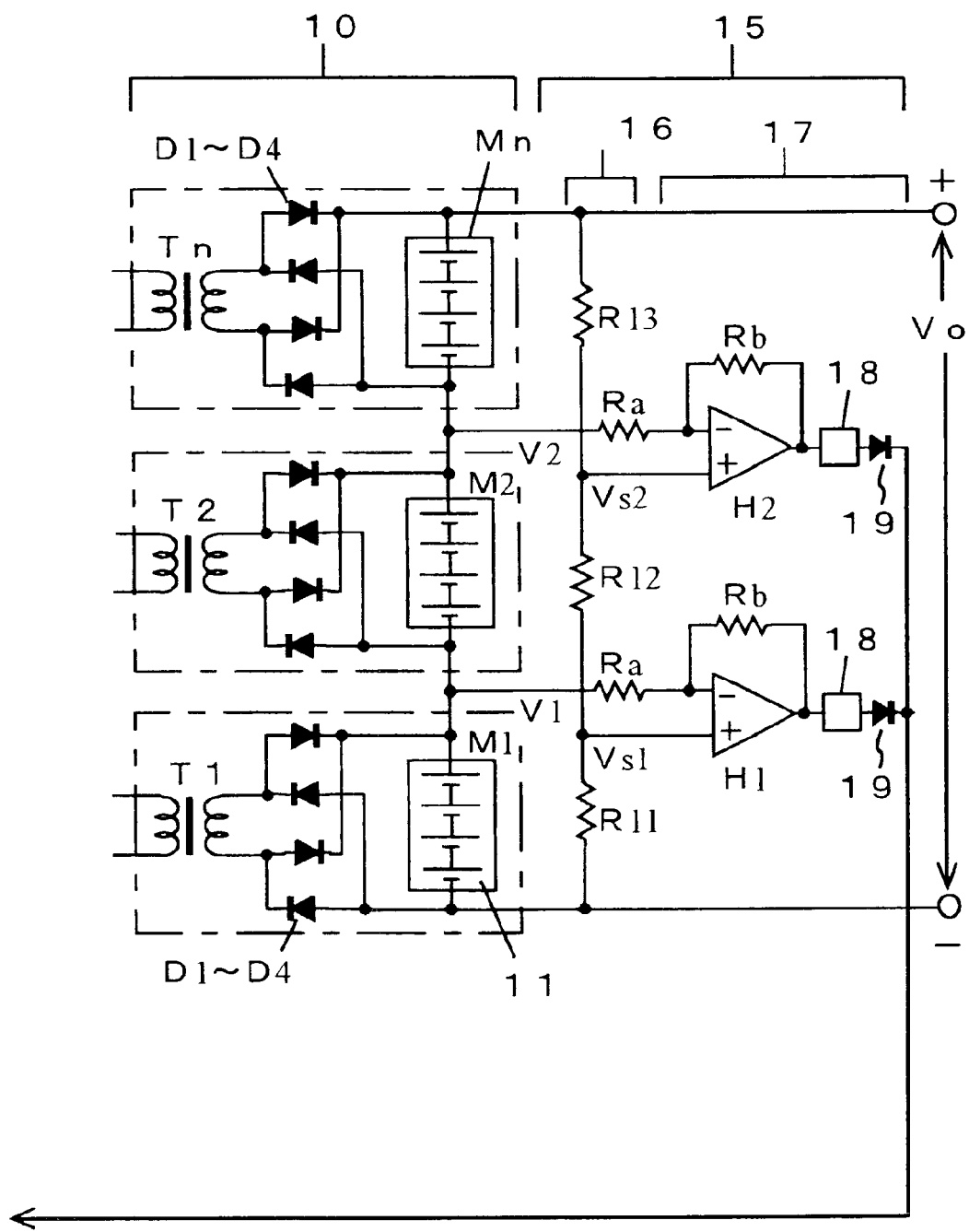
FIG. 2 is a circuit diagram illustrating a main section of a more preferable embodiment of the present invention.
Figure 3:
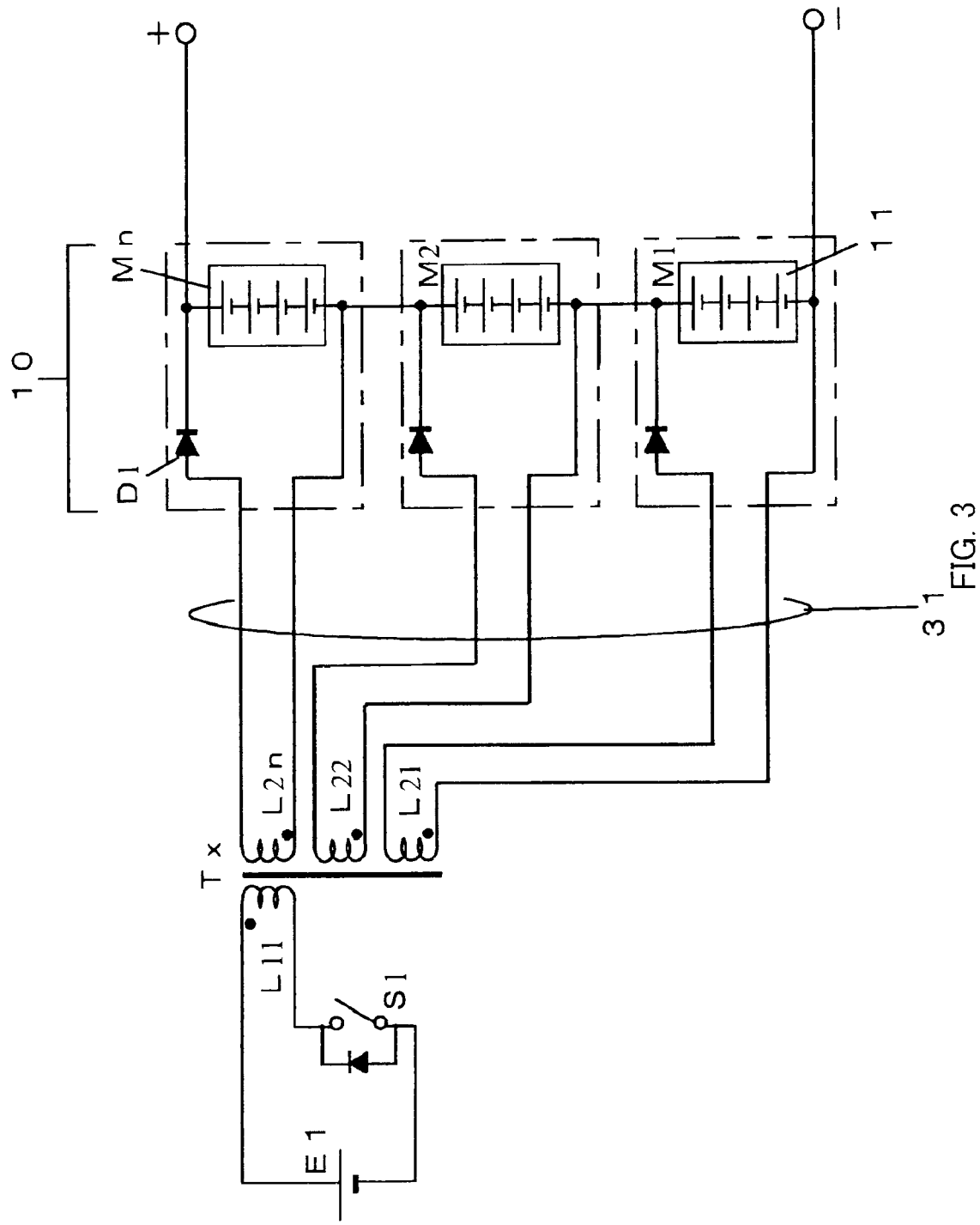
FIG. 3 a circuit diagram illustrating a voltage balancing circuit of a related art that was considered before the present invention.

FIG. 2 is a diagram showing a main section of a further preferable embodiment of the circuit shown in FIG. 1.

In the embodiment shown in FIG. 1, the voltage dividing circuit 16 for obtaining the reference voltages Vs1, Vs2 is provided for each of the reference voltages Vs1, Vs2. However, in the embodiment shown in FIG. 2, the voltage dividing circuit 16 for obtaining such reference voltages Vs1, Vs2 includes a single series of series-connected resistive elements R11, R12, R13. Each of the resistive elements R11, R12, R13 has the same value and reference voltages Vs1, Vs2 which are the same as intermediate voltages expected to appear at a connecting points between the modules M1, M2, Mn are divided and generated at the connecting points (tap).

The voltage dividing circuit 16 including the single series of series-connected resistive elements R11, R12, R13 is particularly effective in a case where the number of modules in the series-connected storage cells 10 is large.

What is claimed is:

1. An electricity storage system comprising:
 a plurality of storage modules connected in series, each storage module including a single storage cell or a plurality of storage cells connected in series;
 an isolation transformer and a rectifying circuit that are associated with each of the storage modules, the isolation transformer having a primary winding and a secondary winding;
 a voltage balancing circuit that generates an alternating current by switching a direct-current power source; and
 a balance detection circuit that detects a difference between voltages on the storage modules,
 the primary windings of the isolation transformers being all connected in parallel and connected to an output end of the voltage balancing circuit by a common wiring,
 the secondary windings of the isolation transformers being connected to the corresponding storage modules via the respective rectifying circuits,
 the alternating current being supplied to the primary winding of each of the isolation transformers,
 in accordance with an output of the balance detection circuit, the voltage balancing circuit being configured to perform a switching operation in the case where there is a difference between or among voltages on the storage modules and increase a frequency of the switching as a difference between or among voltages on the storage modules becomes greater at the time of the switching operation.

2. The electricity storage system according to claim 1, wherein the voltage balancing circuit includes a switch that switches the direct-current power source, a switching control circuit that turns ON/OFF the switch, and an inductance that is provided on an alternating current path.

3. The electricity storage system according to claim 2, wherein the voltage balancing circuit includes a capacitor on the alternating current path in addition to the inductance.

4. The electricity storage system according to claim 1, wherein, in accordance with an output of the balance detection circuit, the voltage balancing circuit stops a switching operation in a case where the difference between the voltages on the storage modules is less than or equal to a reference.

5. The electricity storage system according to claim 1, wherein a reference voltage is a voltage that appears at a connecting point between the storage modules in a case where voltages of the storage modules are equal, and the balance detecting circuit detects the difference between a voltage at the connecting point between the storage modules and the reference voltage.

6. The electricity storage system according to claim 1, wherein the direct-current power source of the voltage balancing circuit is the storage modules connected in series.

7. The electricity storage system according to claim 1, wherein the direct-current power source of the voltage balancing circuit is an external power source that is different from the storage modules and the storage modules are charged by the external power source via the voltage balancing circuit.

8. An electricity storage system comprising:
   a plurality of storage modules connected in series, each storage module including a single storage cell or a plurality of storage cells connected in series;
   an isolation transformer and a rectifying circuit that are associated with each of the storage modules, the isolation transformer having a primary winding and a secondary winding; and
   a voltage balancing circuit that generates an alternating current by switching a direct-current power source,
   the primary windings of the isolation transformers being all connected in parallel and connected to an output end of the voltage balancing circuit by a common wiring,
   the secondary windings of the isolation transformers being connected to the corresponding storage modules via the respective rectifying circuits,
   the alternating current being supplied to the primary winding of each of the isolation transformers,
   the voltage balancing circuit including
      a first capacitor and a second capacitor that are connected in series to both ends of the direct-current power source,
      a first switch and a second switch that are connected in series to the both ends of the direct-current power source,
      an inductance connected on a common wiring that links a connection point between the first and second capacitors and a connection point between the first and second switches to the primary windings of the respective isolation transformers, and
      a switching control circuit that turns ON the first and second switches in an alternating manner.

9. The electricity storage system according to claim 8, further comprising a balance detection circuit that detects a difference between voltages on the storage modules.

10. The electricity storage system according to claim 9, wherein, in accordance with an output of the balance detection circuit, the switching control circuit decreases a time interval during which the first and second switches are turned ON as the difference between the voltages of the storage modules becomes greater.

11. The electricity storage system according to claim 9, wherein, in accordance with an output of the balance detection circuit, the switching control circuit keeps the first and second switches in an OFF state in a case where the difference between the storage modules is less than or equal to a reference.

* * * * *